United States Patent
Klingenberg et al.

(10) Patent No.: US 10,761,945 B2
(45) Date of Patent: Sep. 1, 2020

(54) DYNAMICALLY DIRECTING DATA IN A DEDUPLICATED BACKUP SYSTEM

(71) Applicant: International Business Machines Corporation, Armonk, NY (US)

(72) Inventors: Bernhard J. Klingenberg, Grover Beach, CA (US); Daniela Kern Mainieri Trevisan, Porto Alegre (BR); Kurt Rybczyk, New Haven, CT (US); Lisa A. Shepard, Newtown, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/012,185

(22) Filed: Jun. 19, 2018

(65) Prior Publication Data
US 2019/0384675 A1 Dec. 19, 2019

(51) Int. Cl.
G06F 11/14 (2006.01)
G06F 3/06 (2006.01)

(52) U.S. Cl.
CPC .......... *G06F 11/1453* (2013.01); *G06F 3/067* (2013.01); *G06F 3/0626* (2013.01); *G06F 3/0641* (2013.01)

(58) Field of Classification Search
CPC ...... G06F 3/067; G06F 3/0641; G06F 3/0626; G06F 11/1453
See application file for complete search history.

(56) References Cited

U.S. PATENT DOCUMENTS

| | | | |
|---|---|---|---|
| 5,813,017 A | 9/1998 | Morris | |
| 8,140,786 B2 | 3/2012 | Bunte et al. | |
| 8,660,994 B2 * | 2/2014 | Slater | G06F 11/1453 707/664 |
| 9,575,673 B2 | 2/2017 | Mitkar et al. | |
| 9,852,076 B1 * | 12/2017 | Garg | G06F 16/172 |
| 9,916,320 B2 * | 3/2018 | Harnik | G06F 16/1744 |
| 10,162,832 B1 * | 12/2018 | Mankude | G06F 16/116 |
| 10,409,495 B1 * | 9/2019 | Baruch | G06F 3/0608 |
| 2010/0036887 A1 * | 2/2010 | Anglin | G06F 3/0608 707/812 |
| 2010/0070478 A1 * | 3/2010 | Anglin | G06F 11/1453 707/674 |
| 2010/0082558 A1 * | 4/2010 | Anglin | G06F 3/0604 707/694 |

(Continued)

OTHER PUBLICATIONS

Meister et al., "Multi-Level Comparison of Data Deduplication in a Backup Scenario," Proceedings of SYSTOR 2009: The Israeli Experimental Systems Conference, ACM, 2009, 12 pages.

(Continued)

*Primary Examiner* — Ryan Bertram
(74) *Attorney, Agent, or Firm* — Yee & Associates, P.C.

(57) ABSTRACT

A method, apparatus, system, and computer program product for dynamically directing data in a deduplication backup system. A computer system identifies a data type for the data. The computer system determines whether the data is suitable for deduplication in the deduplication backup system based on the data type identified for the data and a policy. The computer system directs the data to a deduplication storage pool responsive to the data having the data type that is suitable for deduplication, reducing storage usage issues for backing up the data in the computer system.

16 Claims, 6 Drawing Sheets

(56) References Cited

U.S. PATENT DOCUMENTS

| | | | |
|---|---|---|---|
| 2010/0332401 A1* | 12/2010 | Prahlad | G06F 3/0649 |
| | | | 705/80 |
| 2011/0016091 A1* | 1/2011 | Prahlad | G06F 11/1453 |
| | | | 707/654 |
| 2012/0204024 A1 | 8/2012 | Augenstein et al. | |
| 2013/0198150 A1* | 8/2013 | Kim | G06F 16/1752 |
| | | | 707/692 |
| 2014/0136491 A1* | 5/2014 | Nemoto | G06F 3/0608 |
| | | | 707/692 |
| 2014/0188805 A1 | 7/2014 | Vijayan | |
| 2014/0258370 A1 | 9/2014 | Bares et al. | |
| 2014/0281258 A1* | 9/2014 | Callaway | G06F 12/0891 |
| | | | 711/135 |
| 2015/0242264 A1* | 8/2015 | Vibhor | G06Q 10/06 |
| | | | 714/57 |
| 2016/0012071 A1* | 1/2016 | Herman | G06F 16/128 |
| | | | 707/649 |
| 2016/0147800 A1* | 5/2016 | Huang | G06F 12/0813 |
| | | | 707/692 |
| 2019/0034449 A1* | 1/2019 | Zhang | G06F 13/1668 |

OTHER PUBLICATIONS

"Data DeDuplication Background: A Technical White Paper," Quantum Corporation, Feb. 2018, 12 pages. http://www.zdnet.co.kr/biz/quantum/file/03_Data_Deduplication_Background_A_Technical_White_Paper.pdf.

Douglis et al., "Application-specific Delta-encoding via Resemblance Detection," USENIX Annual Technical conference, General Track, 2003, 23 pages.

Policroniades et al., "Alternatives for Detecting Redundancy in Storage Systems Data," USENIX Annual Technical Conference, General Track, 2004, 23 pages.

* cited by examiner

DYNAMICALLY DIRECTING DATA IN A DEDUPLICATED BACKUP SYSTEM

BACKGROUND

1. Field

The disclosure relates generally to an improved computer system and, more specifically, to a method, an apparatus, a system, and a computer program product for directing data in a deduplicated backup system.

2. Description of the Related Art

Data loss can occur during storage, transmission, or processing of data. To reduce the effects and issues of data loss, backups of data can be performed in which data is copied and archived such that the backed-up version of the data can be restored if a data loss event occurs.

Reducing the amount of storage space needed for backing up data is desirable with the large amounts of data that are present in network data processing systems. Different mechanisms can be important to reduce the amount of storage space needed for a backup of data. Many backup processes include an ability to perform deduplication of data. This deduplication of data involves removing duplicate data to obtain a smaller footprint of data that is processed to form a backup.

With deduplication, the process eliminates redundant copies of data to reduce storage usage for the backup. The deduplication process ensures that only one instance of the data is retained on a storage device. Redundant data is replaced with a pointer to a unique copy of the data.

For example, in an email system, multiple copies of the same attachment may be present. For example, a hundred copies of an attachment may be a presentation file that is 2 megabytes in size. When a backup is performed, archiving all of these copies of the presentation file uses 200 megabytes of storage for this attachment. With deduplication, the amount of storage space needed drops to 2 megabytes for this particular attachment.

When implementing a deduplication backup system, assumptions may be made about the types of data to estimate the deduplication ratios. For example, a deduplication ratio of 5:1 means that 5 terabytes of data can be detected to obtain 1 terabyte of data for the backup. If 5 terabytes of data are typically backed up, the deduplication backup system may allocate 1 terabyte of storage space for the backup data rather than 5 terabytes. These assumptions allow a more efficient allocation of storage space in a network data processing system.

However, these assumptions assume that compressed data is not present in the 5 terabytes of data. Compressed data cannot be deduplicated efficiently. If 500 gigabytes of compressed data is present in the 5 terabytes of data, backing up these 500 gigabytes of data uses half of the storage space even though this compressed data only comprises 10 percent of the 5 terabytes of data that is to be backed up. As a result, only 4500 gigabytes of storage space remains for the remaining 4.5 terabytes of data that is to be backed up. As a result, additional storage is needed or the backup of the data will not run properly.

Therefore, it would be desirable to have a method, an apparatus, a system, and a computer program product that take into account at least some of the issues discussed above, as well as other possible issues. For example, it would be desirable to have a method and apparatus that overcome a technical problem with backing up data using a data deduplication process in which data is present that does not compress at the estimated deduplication ratio.

SUMMARY

According to one embodiment of the present invention, a method for dynamically directing data in a deduplication backup system is present. A computer system identifies a data type for the data. The computer system determines whether the data is suitable for deduplication in the deduplication backup system based on the data type identified for the data and a policy. The computer system directs the data to a deduplication storage pool responsive to the data having the data type that is suitable for deduplication, reducing storage usage issues for backing up the data in the computer system.

According to another embodiment of the present invention, a data backup system comprises a computer system and a data director running on the computer system. The data director identifies a data type for data and determines whether the data is suitable for deduplication in a deduplication backup system based on the data type identified for the data and a policy. The data director directs the data to a deduplication storage pool responsive to the data having the data type that is suitable for deduplication, reducing storage usage issues for backing up the data in the computer system.

According to yet another embodiment of the present invention, a computer program product for dynamically directing data in a deduplication backup system comprises a computer-readable storage media, first program code, second program code, third program code, and fourth program code stored on the computer-readable storage media. The first program code is run to identify a data type for the data. The second program code is run to determine whether the data is suitable for deduplication by the deduplication backup system based on the data type identified for the data and a policy. The third program code is run to direct the data to a deduplication storage pool responsive to the data having the data type that is suitable for deduplication, reducing backup issues in the computer system with respect to storage usage, reducing storage usage issues for backing up the data in the computer system.

DETAILED DESCRIPTION

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In an illustrative embodiment, a method, an apparatus, a system, a computer system, and computer program product dynamically directs data for deduplication. The computer system identifies a data type for the data. The computer system determines whether the data is suitable for deduplication based on the data type identified for the data and a policy. The computer system directs the data to a deduplication storage pool responsive to the data being suitable for deduplication in a deduplication backup system. The computer system operates in a manner that reduces backup issues in the computer system with respect to storage usage.

Figure 1:
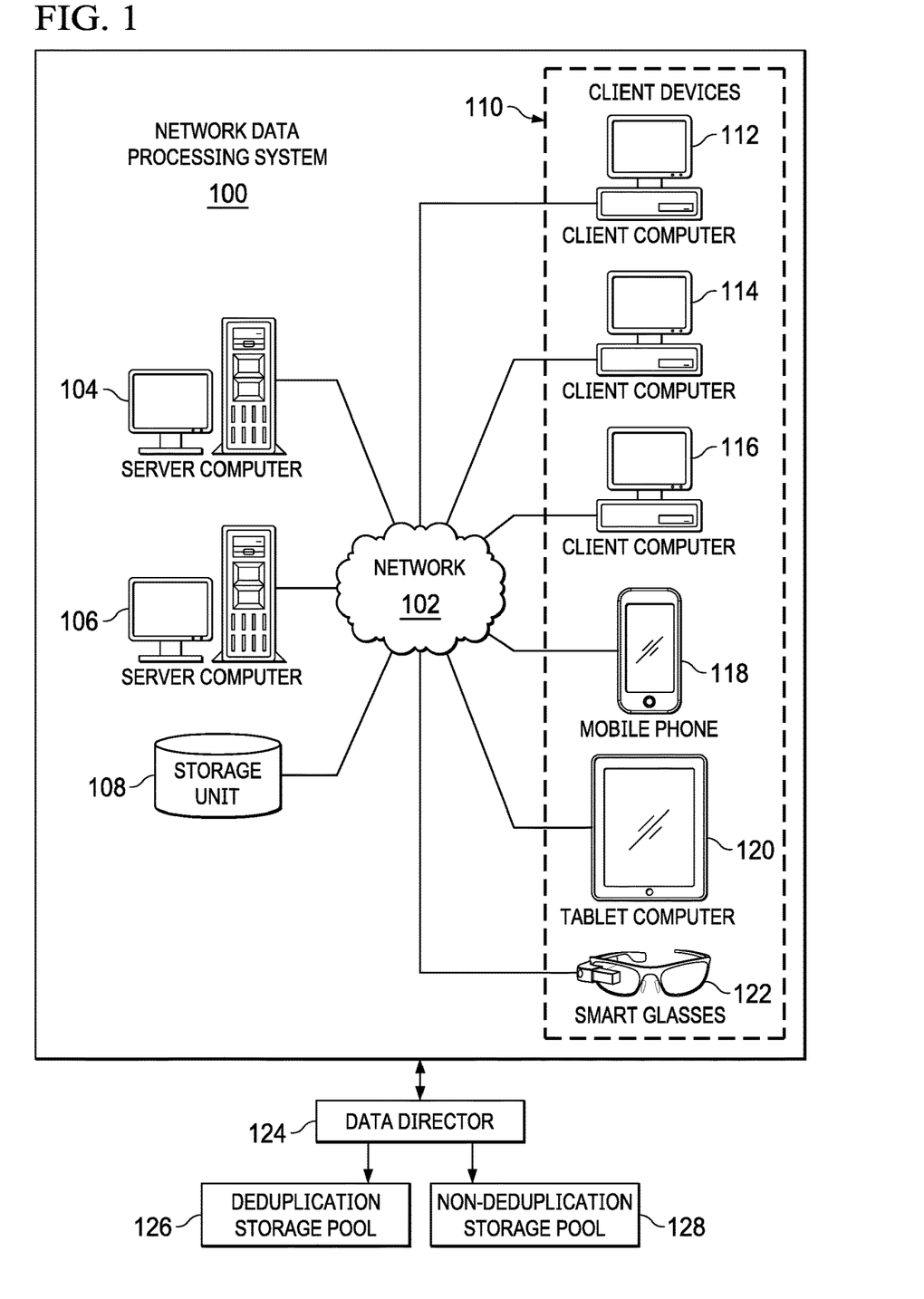
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, some or all of client devices 110 may form an Internet of things (IoT) in which these physical devices can connect and exchange data.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 may also be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example may also include item A, item B, and item C or item B and item C. Of course, any combinations of these items may be present. In some illustrative examples, "at least one of" may be, for example, without limitation, two of item A; one of item B; ten of item C; four of item B and seven of item C; or other suitable combinations.

In this illustrative example, one or more of client devices 110 may be backed up in network data processing system 100. These backups may be performed in a number of different ways. For example, client computer 112 may perform a local backup, in which data is backed up in client computer 112. In another example, client computer 112 may perform a backup of data in which the backup is stored in storage unit 108. In another illustrative example, server computer 104 may perform backups from one or more of client devices 110 such that the backups are stored on server computer 104, storage unit 108, or some combination thereof.

In the illustrative examples, a storage pool is a location in a storage device where data can be stored. The location may be, for example, a directory, a cache, or some other construct for storing data within network data processing system 100.

In these illustrative examples, deduplication of data may be performed to reduce the size of the backups. In allocating storage space within network data processing system 100 for backups, the data may be directed into different types of storage pools for performing deduplication in the backup process.

In this illustrative example, data director 124 can direct data to at least one of deduplication storage pool 126 or non-deduplication storage pool 128 based on the data type for the data. This directing of data is performed dynamically and the data is examined to determine whether the data should be deduplicated. Data that should be deduplicated is directed to deduplication storage pool 126, while data that is not suitable for deduplication is directed to non-deduplication storage pool 128 when a backup is performed. Data in deduplication storage pool 126 is duplicated while data in non-deduplication storage pool 128 is not duplicated when a backup is performed.

In this illustrative example, data director 124 can be located on any one of the different data processing systems in network data processing system 100. Alternatively, data director 124 can be distributed within network data processing system 100. The storage pools can be located in storage unit 108. The storage pools can also be distributed within different data processing systems in network data processing system 100.

Figure 2:
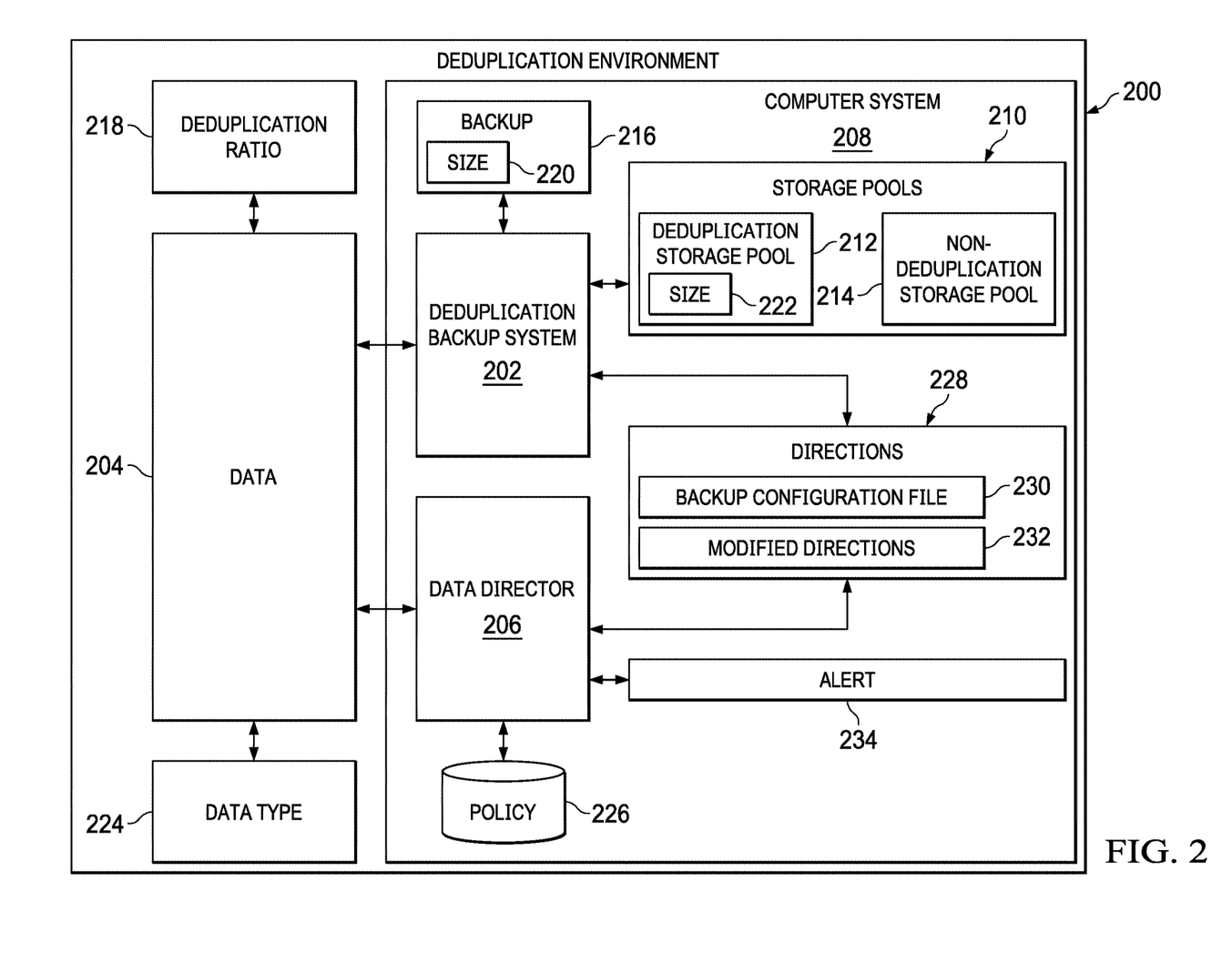
FIG. 2 is a block diagram of a deduplication environment in accordance with an illustrative embodiment.

With reference now to FIG. 2, a block diagram of a deduplication environment is depicted in accordance with an illustrative embodiment. In this illustrative example, deduplication environment 200 includes components that can be implemented in hardware, such as the hardware shown in network data processing system 100 in FIG. 1.

As depicted, deduplication backup system 202 operates in deduplication environment 200 to back up data 204. In this illustrative example, data director 206 runs on computer system 208 and operates to direct data 204 to storage pools 210. In the illustrative example, data 204 comprises at least one of a file, a block of data 204, or some other piece of data 204. In this example, a block of data 204 comprises a sequence of at least one of bits or bytes.

Computer system 208 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet computer, or some other suitable type of data processing system.

In this illustrative example, a storage pool in storage pools 210 is a location in which data 204 can be stored. A storage pool can be located in at least one of a disk drive, a hard disk drive, a solid-state drive, memory, or some other storage device.

In this illustrative example, storage pools 210 comprises deduplication storage pool 212 and non-deduplication storage pool 214. Data director 206 operates to direct data 204 to at least one of deduplication storage pool 212 or non-deduplication storage pool 214.

Deduplication backup system 202 process data 204 located in at least one of deduplication storage pool 212 or non-deduplication storage pool 214 to form backup 216. In this illustrative example, backup 216 includes data 204 and may also include other data.

As depicted, data director 206 operates to direct data 204 to at least one of deduplication storage pool 212 or non-deduplication storage pool 214 in a manner that maintains deduplication ratio 218 for data 204 when deduplication backup system 202 deduplicates data 204 that is located in deduplication storage pool 212.

This directing of data 204 by data director 206 results in backup 216 having size 220 that falls within the amount of storage allocated for backup 216. In this depicted example, the amount of storage allocated can be size 222 for deduplication storage pool 212.

Data director 206 can direct data 204 to storage pools 210 prior to deduplication backup system 202 running to form backup 216. In other examples, data director 206 can operate while deduplication backup system 202 operates to perform backup 216.

In the illustrative example, data director 206 dynamically directs data 204 in deduplication backup system 202. In other words, data director 206 can direct data 204 as data 204 is received, while deduplication backup system 202 performs a backup, or some combination thereof.

As depicted, data director 206 running on computer system 208 identifies data type 224 for data 204. Data director 206 determines whether data 204 is suitable for deduplication in deduplication backup system 202 based on data type 224 identified for data 204 and policy 226.

As depicted, policy 226 is one or more rules that are applied to data 204 to determine whether data 204 is suitable for deduplication. In this depicted example, policy 226 may be applied to data 204 in determining whether data 204 has data type 224 that is suitable for deduplication. For example, policy 226 may specify at least one of compressed data, encrypted data, or other data types as being unsuitable for deduplication. As another example, policy 226 can specify a test or a rule for determining whether data 204 is unsuitable for deduplication. Policy 226 can have a rule that is applied to determine whether data 204 is encrypted.

For example, with a sequel database, policy 226 can have a rule such as 'is "enableclientencyptkey" present in a dsm.opt file for a client backup process. If the key if "enableclientencyptkey" is present, then data 204 is encrypted before being sent by deduplication backup system 202 for backing up.

In another example, the rule in policy 226 may examine an encryption_state value for data 204 in the form of a structured query language (SQL) database. The rule in policy 226 is if the value for "encryption_state" is 3, 4, 5, or 6, encryption is present in data 204.

In another illustrative example, policy 226 can include a rule to determine whether data 204 is compressed. For example, a rule in policy 226 can state that if a file extension from a group comprising "*.tar", "*.zip", and "*.gz" is present then data 204 is compressed. In another example, policy 226 can have a rule for examining a configuration file for an application that creates data 204. For example, policy 226 can state that compression is present if a compression option is set in a configuration file for an application associated with data 204, compression of data 204 is present.

As depicted, data director 206 directs data 204 to deduplication storage pool 212 in response to data 204 having data type 224 that is suitable for deduplication. Data director 206 directs data 204 to non-deduplication storage pool 214 in response to data 204 having data type 224 that is unsuitable for deduplication, reducing storage usage issues for backing up data 204 in computer system 208.

In this illustrative example, data director 206 directs data 204 to storage pools 210 using directions 228 that are used by deduplication backup system 202 to copy or move data 204 to storage pools 210. Directions 228 may be located in backup configuration file 230.

As depicted, data director 206 directs data 204 to non-deduplication storage pool 214 in response to data 204 being unsuitable for deduplication by modifying directions 228 for a backup process to send data 204 to non-deduplication storage pool 214 to form modified directions 232 in response to data 204 having data type 224 that is unsuitable for deduplication. For example, if data 204 is located in a file name, the file name for data 204 can be included in directions 228 for directing data 204 to non-deduplication storage pool 214.

If data 204 has data type 224 that is suitable for data deduplication, directions 228 may be unchanged when the default movement of data 204 is to deduplication storage pool 212. In other words, data director 206 directs data 204 to deduplication storage pool 212 by leaving directions 228 unmodified with respect to data 204.

Data director 206 modifies directions 228 to identify at least one of a file name, a file extension, or a directory name for a directory that contains data 204 to be sent to non-deduplication storage pool 214 during backup 216. A directory may be selected if most files for data 204 are not suitable for deduplication even though some files might be suitable for deduplication. Lines or parameters can be added to directions 228 to specify specific data structures that are to be directed to non-deduplication storage pool 214 in forming modified directions 232. Thus, deduplication backup system 202 backs up data 204 using modified directions 232.

In one illustrative example, non-deduplication storage pool 214 may be unavailable for deduplication backup system 202. In this situation, data director 206 generates alert 234 in response to data 204 having data type 224 being unsuitable for deduplication. Alert 234 can take a number of different forms. For example, alert 234 comprises at least one of an error message, an audible sound, a report identifying the data, an email message, or some other suitable type of alert.

Data director 206 may be implemented in software, hardware, firmware, or a combination thereof. When software is used, the operations performed by data director 206 may be implemented in program code configured to run on hardware, such as a processor unit. When firmware is used, the operations performed by data director 206 may be implemented in program code and data and stored in persistent memory to run on a processor unit. When hardware is employed, the hardware may include circuits that operate to perform the operations in data director 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the process may be implemented in organic components integrated with inorganic components and may be comprised entirely of organic components excluding a human being. For example, the process may be implemented as circuits in organic semiconductors.

In one illustrative example, one or more technical solutions are present that overcome a technical problem with backing up data using a data deduplication process in which data is present that does not compress at the estimated deduplication ratio. As a result, one or more technical solutions may provide a technical effect of maintaining deduplication ratios for backing up data. As a result, one or more technical solutions may provide a technical effect of reducing issues with deduplicating data for a backup through increased predictability of the amount of storage needed for a backup when data is deduplicated.

As a result, computer system 208 operates as a special purpose computer system in which data director 206 in computer system 208 enables more efficient data deduplication in computer system 208, resulting in more efficient use of storage in computer system 208. In particular, data director 206 transforms computer system 208 into a special purpose computer system as compared to currently available general computer systems that do not have data director 206.

The illustration of deduplication environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, data director 206 is shown as a separate component from deduplication backup system 202. In some illustrative examples, data director 206 can be part of deduplication backup system 202. In another illustrative example, policy 226 may identify at least one of specific file names or directory names containing data 204 having data type 224 as unsuitable for deduplication instead of or in addition to those file names or directory names being found in directions 228 in backup configuration file 230. When at least one of file names or directory names are used, an analysis of data 204 itself within the files or directories is unnecessary using backup configuration file 230. For example, data director 206 can examine backup configuration file 230 to determine whether at least one of a file name or a directory name for data 204 is present in backup configuration file 230. This mechanism reduces the amount of processing needed to direct data 204 to the appropriate storage pool in storage pools 210.

Figure 3:
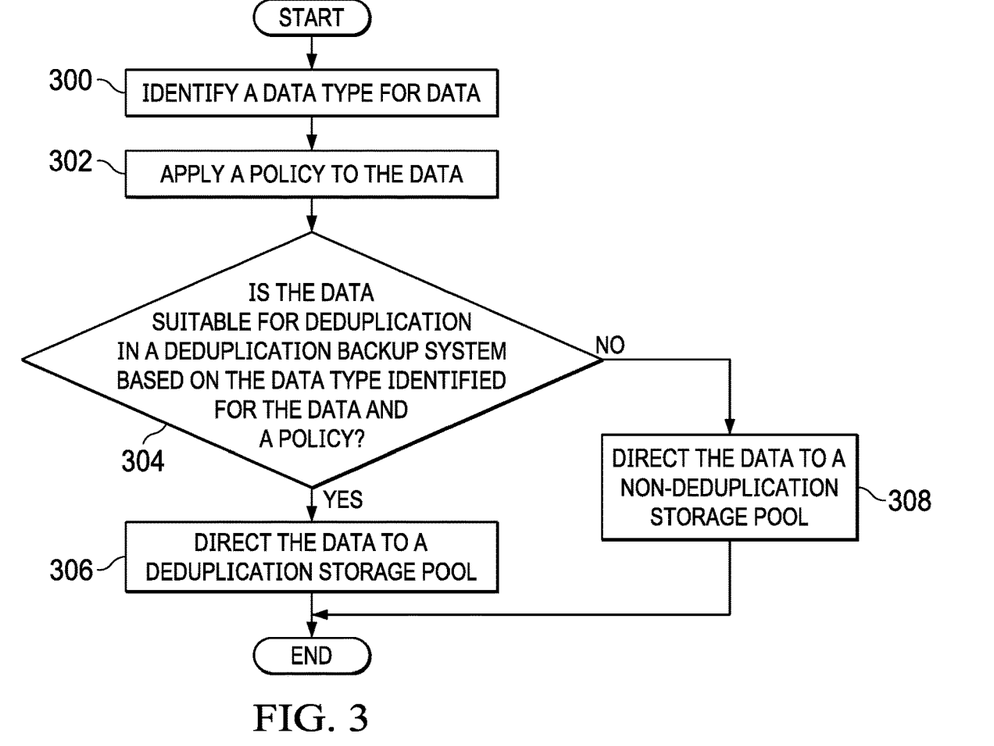
FIG. 3 is a flowchart of a process for dynamically directing data in a deduplication backup system in accordance with an illustrative embodiment.

Turning next to FIG. 3, a flowchart of a process for dynamically directing data in a deduplication backup system is depicted in accordance with an illustrative embodiment. The process in FIG. 3 can be implemented in hardware, software, or both. When implemented in software, the process can take the form of program code that is run by one of more processor units located in one or more hardware devices in one or more computer systems. For example, this process can be implemented in data director 206 running on computer system 208 in FIG. 2.

The process begins by identifying a data type for data (step 300). The process applies a policy to the data (step 302). A determination is made as to whether the data is suitable for deduplication in a deduplication backup system based on the data type identified for the data and a policy (step 304). In response to the data having the data type that is suitable for deduplication, the process directs the data to a deduplication storage pool (step 306). The process terminated thereafter.

With reference again to step 304, responsive to the data having the data type that is unsuitable for deduplication, the process directs the data to a non-deduplication storage pool (step 308). The process terminates thereafter. This process reduces storage usage issues for backing up data in a computer system.

Figure 4:
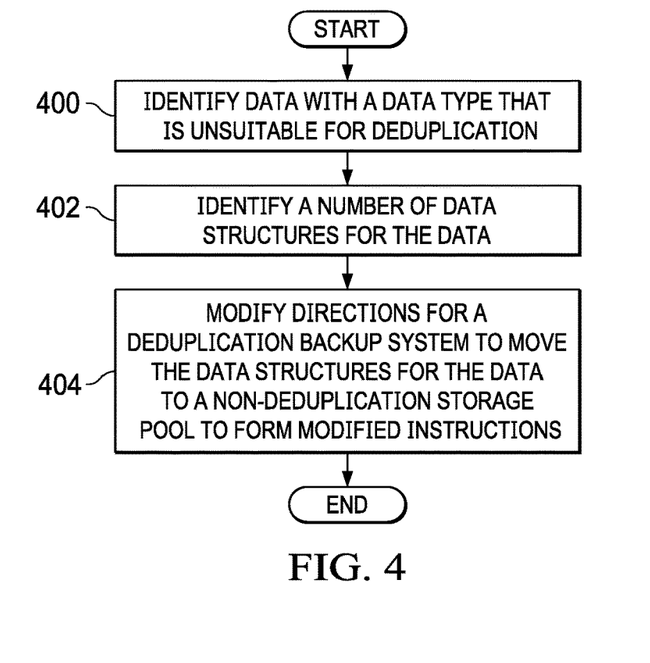
FIG. 4 is a flowchart of a process for directing data in accordance with an illustrative embodiment.

Turning next to FIG. 4, a flowchart of a process for directing data is depicted in accordance with an illustrative embodiment. The process in FIG. 4 is an example of how data can be directed to a non-deduplication storage pool in FIG. 3.

The process begins by identifying data with a data type that is unsuitable for deduplication (step 400). The process identifies a number of data structures for the data (step 402). The number of data structures may be at least one of a file, a block of data, a directory, or some other data structure. The process modifies directions for a deduplication backup system to move the data structures for the data to a non-deduplication storage pool to form modified instructions (step 404). The process terminates thereafter.

Figure 5:
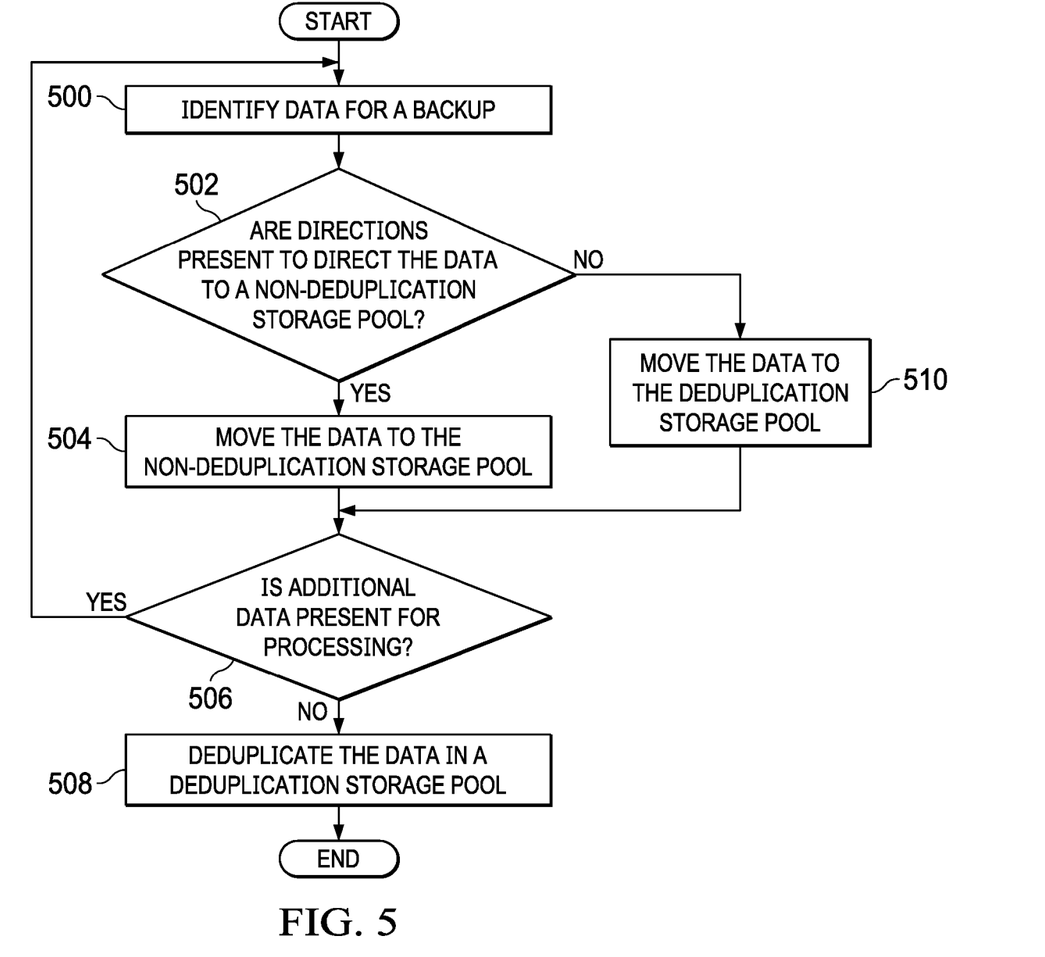
FIG. 5 is a flowchart of a process for backing up data in accordance with an illustrative embodiment.

With reference now to FIG. 5, a flowchart of a process for backing up data is depicted in accordance with an illustrative embodiment. The process in FIG. 5 can be implemented in hardware, software, or both. When implemented in software, the process can take the form of program code that is run by one of more processor units located in one or more hardware devices in one or more computer systems. For example, this process can be implemented in deduplication backup system 202 running on computer system 208 in FIG. 2. This process can be used to create backup 216 in FIG. 2.

The process beings by identifying data for a backup (step 500). The process determines if directions are present to direct the data to a non-deduplication storage pool (step 502). Directions for particular pieces of data can be placed in a backup configuration file to direct those pieces of data to the non-deduplication storage pool instead of a deduplication storage pool.

If directions are present to direct the data to the non-deduplication storage pool, the process moves the data to the non-deduplication storage pool (step 504). A determination is made as to whether additional data is present for processing (step 506). Other data may be present in addition to data 204 in FIG. 2 that is to be backed up. If addition data is present for processing, the process returns to step 500.

Otherwise, the process deduplicates the data in a deduplication storage pool (step 508). The process terminates thereafter. In step 508, the process identifies unique copies of chunks of data. As the process continues, other chunks of data are compared to the unique copies and whenever a match occurs, the redundant chunk is replaced with a small reference that points to the stored chunk of data.

With reference again to step 502, if directions are not present to direct the data to the non-deduplication storage pool, the process moves the data to the deduplication storage pool (step 510). The process then proceeds to step 506.

Figure 6:
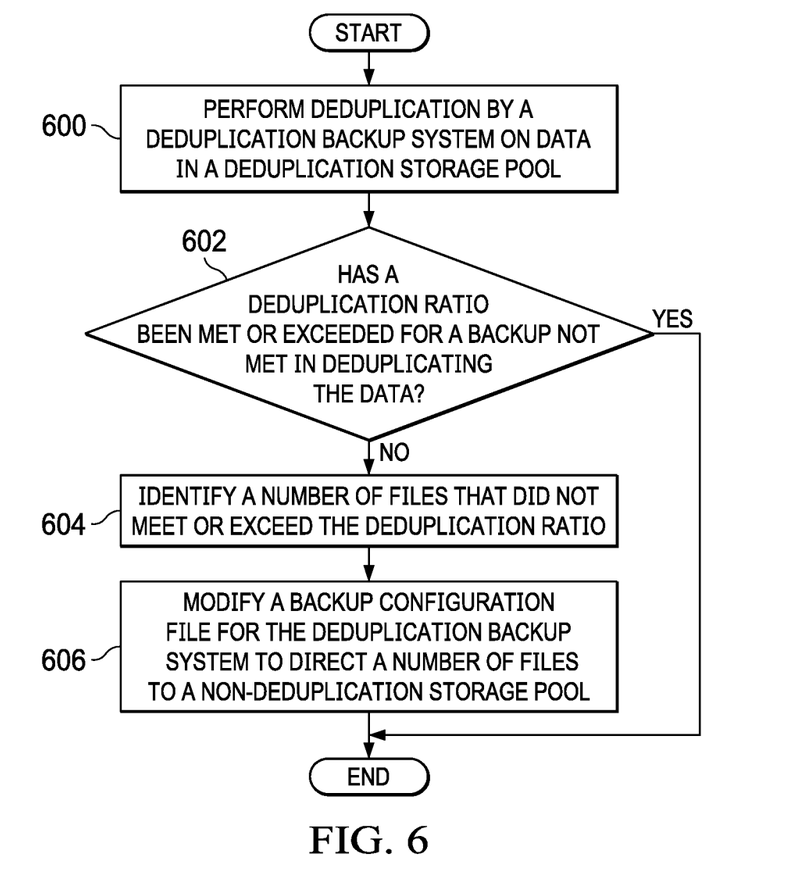
FIG. 6 is a flowchart of a process for automatically updating directions for deduplicating data in accordance with an illustrative embodiment.

With reference to FIG. 6, a flowchart of a process for automatically updating directions for deduplicating data is depicted in accordance with an illustrative embodiment. The process in FIG. 6 can be implemented in hardware, software, or both. When implemented in software, the process can take the form of program code that is run by one of more processor units located in one or more hardware devices in one or more computer systems. For example, this process can be implemented in data director 206 and deduplication backup system 202 running on computer system 208 in FIG. 2. This process can be used to automatically modify directions 228, which identifies data with data types that should be deduplicated and data with data types that should not be deduplicated using the deduplication process in deduplication backup system 202 in FIG. 2. In FIG. 6, deduplication backup system 202 provides feedback to data director 206 with the feedback being used to modify directions 228, such as backup configuration file 230 in FIG. 2.

The process begins with a deduplication backup system performing deduplication on data in a deduplication storage pool (step 600). A determination is made by the deduplication backup system as to whether a deduplication ratio has been met or exceeded for a backup not met in deduplicating the data (step 602). In step 602, the process examines the amount of reduction in the size of the data to determine whether the deduplication ratio was met or exceeded. If the deduplication ratio was not met or exceeded, a smaller deduplication ratio is present.

With reference again to step 602, if the deduplication ratio was met or exceeded, the process terminates. Otherwise, if the deduplication ratio is not met or exceeded, the deduplication backup system identifies a number of files that did not meet or exceed the deduplication ratio (step 604). The data director uses this identification to modify a backup configuration file for the deduplication backup system to direct a number of files to a non-deduplication storage pool (step 606). The process terminates thereafter.

In this illustrative example, backup configuration file contains a policy that can be modified such that the data type for the number of files is identified as one that causes the data in the number of files to be sent to the non-deduplication storage pool. In still another example, the number of files may be identified using the file names. Placing the names of the number of files in the backup configuration file results in the number of files being directed to the non-duplication storage pool the next time a backup is run in which the number of files is present. In other words, the data director can direct the number of files to the storage pools in future backups using the backup configuration file without having to determine a data type of the number of files.

In some illustrative examples, the identification can be made based on a directory in which the files having the data type are present rather than determining the data type again for those files. In other words, the determination of the data type is made once. For example, if a number of files in a directory are a data type that is not suitable for deduplication, the directory name for the directory may be identified in the backup configuration file. This addition of a directory can be made even though some of the files may be suitable for deduplication. The selection of the directory may be based on the deduplication ratio that is achievable for the data in the different files in that directory. Thus, when the data director sees the directory, the data director can examine the backup configuration file to see if the directory is specified in the backup configuration file. Identifying directories using the backup configuration file avoids the need for the data director to analyze the data prior to a future backup to determine whether the data has a data type that is unsuitable for deduplication.

By identifying at least one of file names or directory names, less processing of data is needed to identify the data type for use in determining whether the data has a data type that should be directed to a deduplication storage pool or a data type that should be directed to a non-deduplication storage pool when a future backup is performed.

In other words, the backup configuration file is used each time a backup occurs. As new files are identified as having a data type that is not suitable for deduplication, the names of the directories in which those files are located can be added to the backup configuration file such that the backup configuration file dynamically changes based on feedback based on the amount of deduplication that occurs while backing up data.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 7:
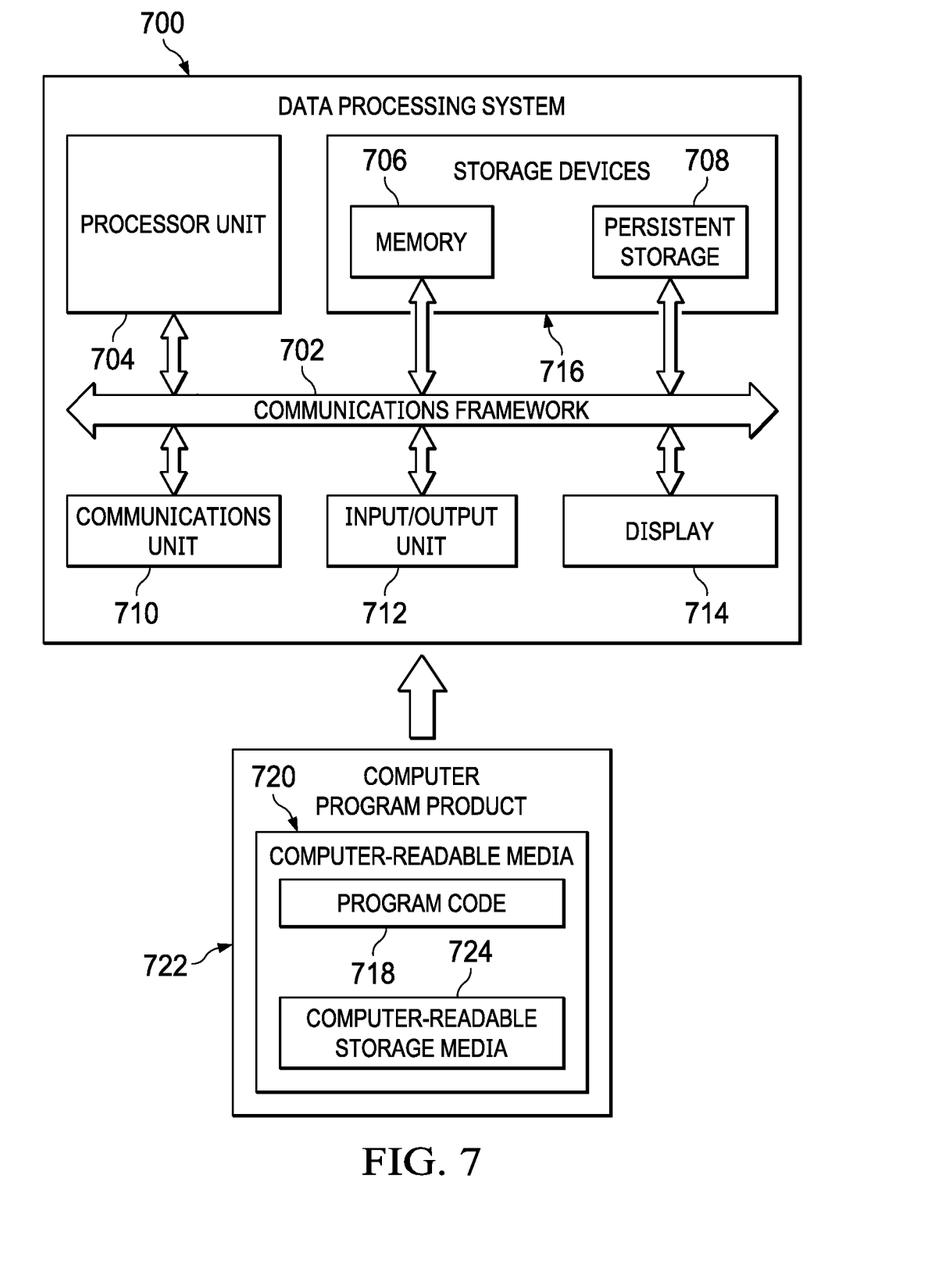
FIG. 7 is a block diagram of a data processing system in accordance with an illustrative embodiment.

Turning now to FIG. 7, a block diagram of a data processing system is depicted in accordance with an illustrative embodiment. Data processing system 700 may be used to implement server computer 104, server computer 106, client devices 110 in FIG. 1, and computer system 208 in FIG. 2. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. For example, memory 706, may be a random-access memory or any other suitable volatile or non-volatile storage device. Persistent storage 708 may take various forms, depending on the particular implementation.

For example, persistent storage 708 may contain one or more components or devices. Persistent storage 708 may be a hard drive, a solid-state drive (SSD), a flash memory, a rewritable optical disk, a rewritable magnetic tape, or some combination of the above. The media used by persistent storage 708 may also be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The process of the different embodiments may be performed by processor unit 704 using computer-implemented instructions, which may be located in a memory, such as memory 706.

These instructions are referred to as program code, computer usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In the illustrative example, computer-readable media 720 is computer-readable storage media 724.

In these illustrative examples, computer-readable storage media 724 is a physical or tangible storage device used to store program code 718 rather than a medium that propagates or transmits program code 718.

Alternatively, program code 718 may be transferred to data processing system 700 using a computer-readable signal media. The computer-readable signal media may be, for example, a propagated data signal containing program code 718. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

Thus, the illustrative embodiments of the present invention provide a computer implemented method, apparatus, system, and computer program product for dynamically directing data for deduplication. A computer system identifies a data type for the data. The computer system determines whether the data is suitable for deduplication based on the data type identified for the data and a policy. The computer system directs the data to a deduplication storage pool responsive to the data being suitable for deduplication in a deduplication backup system. The computer system operates in a manner that reduces backup issues in the computer system with respect to storage usage.

In the illustrative examples, the computer system with a data director, data not suitable for deduplication is examined prior to that data being backed up. The data examined can be, for example, at least one of compressed data or encrypted data. Once the type of data is identified, the data director dynamically updates instructions to direct the backup data to a target destination storage pool that does not use deduplication, such as a non-deduplication storage pool. The instructions are used by the deduplication backup system to move the data.

One or more of the technical solutions in the illustrative examples identify data that does not reduce in size well when deduplicated before the data is sent to the deduplication backup system. Identifying these types of data in advance prevents or reduces the known performance and capacity problems encountered in backup environments, which lead to increased hardware costs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method comprising:
a computer system dynamically directing data in a deduplication backup system by:
identifying a data type for the data;
determining whether the data is suitable for deduplication in the deduplication backup system based on the data type identified for the data and a policy, wherein the policy is different than the data type and comprises a rule for determining whether the data is unsuitable for deduplication;
dynamically directing the data to a deduplication storage pool responsive to the data having the data type that is suitable for deduplication based on the policy, reducing storage usage issues for backing up the data in the computer system; and
directing the data to a non-deduplication storage pool responsive to the data having the data type that is unsuitable for deduplication based on the policy, wherein directing the data to the non-deduplication storage pool responsive to the data having the data type that is unsuitable for deduplication comprises:
responsive to the data having the data type that is unsuitable for deduplication, forming modified directions by modifying existing directions for the deduplication backup system to send the data to the non-deduplication storage pool.

2. The method of claim 1, wherein the modified directions are modified to identify at least one of a file name, a file extension, or a directory containing the data to be sent to the non-deduplication storage pool during a backup.

3. The method of claim 1 further comprising the computer system:
backing up the data using the modified directions.

4. The method of claim 1 further comprising the computer system:
generating an alert responsive to the data having the data type that is unsuitable for deduplication based on the policy and the non-deduplication storage pool being unavailable.

5. The method of claim 3, further comprising:
responsive to backing up the data using the modified directions, determining if a deduplication ratio was met or exceeded;
responsive to the deduplication ratio not being met or exceeded, identifying a number of files that did not meet or exceed the deduplication ratio; and
modifying a backup configuration file for the deduplication backup system to direct the number of files to the non-deduplication storage pool during a subsequent backup operation without having to use a data type for the number of files to make a deduplication suitability determination for the number of files.

6. The method of claim 1, wherein the policy specifies compressed data and encrypted data as being unsuitable for deduplication.

7. A data backup system comprising:
a computer system; and
a data director running on the computer system, wherein the data director is configured to:
identify a data type for data;
determine whether the data is suitable for deduplication in a deduplication backup system based on the data type identified for the data and a policy, wherein the policy is different than the data type and comprises a rule for determining whether the data is unsuitable for deduplication;
dynamically direct the data to a deduplication storage pool responsive to the data having the data type that is suitable for deduplication based on the policy, whereby storage usage issues for backing up the data in the computer system are reduced; and
direct the data to a non-deduplication storage pool responsive to the data having the data type that is unsuitable for deduplication based on the policy, wherein in directing the data to the non-deduplication storage pool responsive to the data being unsuitable for deduplication, modified directions are formed by modifying existing directions for the deduplication backup system to send the data to the non-deduplication storage pool responsive to the data having the data type that is unsuitable for deduplication.

8. The data backup system of claim 7, wherein the modified directions identify at least one of a file name, a file extension, or a directory containing the data to be sent to the non-deduplication storage pool during a backup.

9. The data backup system of claim 7, wherein the deduplication backup system is configured to back up the data using the modified directions.

10. The data backup system of claim 7, wherein the data director generates an alert responsive to:
the data having the data type that is unsuitable for deduplication based on the policy; and
unavailability of the non-deduplication storage pool.

11. The data backup system of claim 7, wherein the policy specifies compressed data and encrypted data as being unsuitable for deduplication.

12. The data backup system of claim 7, wherein the data comprises at least one of files or blocks of data in which a block of data in the blocks of data comprises a sequence of at least one of bits or bytes.

13. A computer program product, comprising:
one or more computer-readable storage media including instructions for directing data, wherein the instructions comprise:
first program code for identifying a data type for the data;
second program code for determining whether the data is suitable for deduplication by a deduplication backup system based on the data type identified for the data and a policy, wherein the policy is different than the data type and comprises a rule for determining whether the data is unsuitable for deduplication;
third program code for dynamically directing the data to a deduplication storage pool responsive to the data having the data type that is suitable for deduplication based on the policy, reducing backup issues in a computer system with respect to storage usage, and reducing storage usage issues for backing up the data in the computer system; and
fourth program code for directing the data to a non-deduplication storage pool responsive to the data having the data type that is unsuitable for deduplication based on the policy, wherein directing the data to the non-deduplication storage pool responsive to the data having the data type that is unsuitable for deduplication comprises forming modified directions by modifying existing directions for the deduplication backup system to send the data to the non-deduplication storage pool responsive to the data having the data type that is unsuitable for deduplication.

14. The computer program product of claim 13, wherein the instructions further comprise:

fourth program code for forming modified directions by modifying existing directions for a deduplication backup system to send the data to a non-deduplication storage pool responsive to the data having the data type that is unsuitable for deduplication.

15. The computer program product of claim 14, wherein the modified directions identify at least one of a file name, a file extension, or a directory containing the data to be sent to the non-deduplication storage pool during a backup.

16. The method of claim 1, wherein the rule is applied to determine whether the data is encrypted.

* * * * *